United States Patent Office
3,410,899
Patented Nov. 12, 1968

3,410,899
PROCESS FOR PRODUCTION OF DEMONOMETH-YLATED COLCHICINIC DERIVATIVES
Georges Muller, Nogent-sur-Marne, Arturo Bladé, Paris, and Roland Bardoneschi, Le Vert Galant, France, assignors to Roussel—UCLAF, Paris, France, a corporation of France
No Drawing. Filed Oct. 27, 1964, Ser. No. 406,883
Claims priority, application France, Oct. 31, 1963, 952,436
8 Claims. (Cl. 260—562)

ABSTRACT OF THE DISCLOSURE

This invention relates to 1-desmethyl colchicinic derivatives of the formula

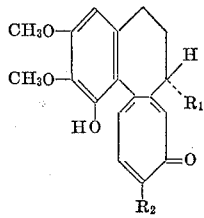

(I)

wherein $R_1$ represents a member of the group consisting of hydrogen and

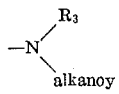

where $R_3$ represents a member selected from the group consisting of hydrogen and lower alkyl, and $R_2$ represents a member selected from the group consisting of lower alkoxy, thio-lower-alkyl, and

where $R_4$ and $R_5$ are selected from the group consisting of lower alkyl and, when taken together with the nitrogen atom, pyrrolidyl and piperidinyl, as well as to the process of preparing the compounds and to the intermediates obtained.

The investigation of the physiologically active derivatives of the colchicinic series has made it possible to indicate processes of modification of the existing functions and/or the introduction of new functions on the tricyclic structure. However, until now, no chemical medium was available to attack the 1 position (the former 4 position) without affecting also the remainder of the molecular structure. (The fundamental skeleton of these compounds will be numbered herein according to the RRI 3923 system of the Ring Index, 2nd edition, 1960.)

An object of the present invention is the obtention a 1-desmethyl colchicinic derivative of the formula

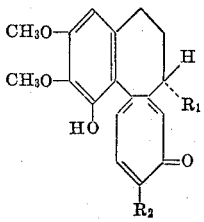

wherein $R_1$ represents a member selected from the group consisting of hydrogen and

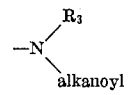

where $R_3$ represents a member selected from the group consisting of hydrogen and lower alkyl, and $R_2$ represents a member selected from the group consisting of lower alkoxy, thio-lower-alkyl, and

where $R_4$ and $R_5$ are selected from the group consisting of lower alkyl and when taken together with the nitrogen, pyrrolidyl and piperidinyl.

A further object of the invention is the obtention of the novel intermediate, a 1-desmethyl colchicinic derivative of the formula

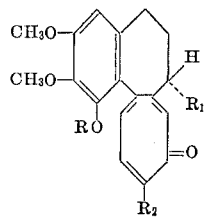

wherein R represents lower alkanoyl, $R_1$ represents a member selected from the group consisting of hydrogen and

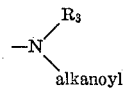

where $R_3$ represents a member selected from the group consisting of hydrogen and lower alkyl, and $R_2$ represents a member selected from the group consisting of lower alkoxy, thio-lower-alkyl, and

where $R_4$ and $R_5$ are selected from the group consisting of lower alkyl and, when taken together with the nitrogen, pyrrolidyl and piperidinyl.

A yet further object of the invention is the development of a process for the production of a 1-desmethyl colchicinic derivative of the formula

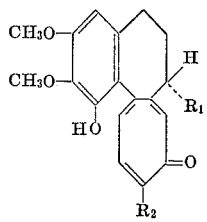

wherein $R_1$ represents a member selected from the group consisting of hydrogen and

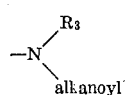

where $R_3$ represents a member selected from the group consisting of hydrogen and lower alkyl, and $R_2$ represents a member selected from the group consisting of lower alkoxy, thio-lower-alkyl, and

where $R_4$ and $R_5$ are selected from the group consisting of lower alkyl and, when taken together with the nitrogen, pyrrolidyl and piperidinyl, which comprises the steps of reacting a colchicinic compound of the formula

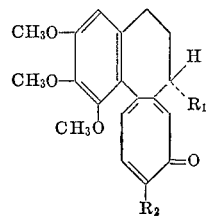

wherein $R_1$ and $R_2$ have the above-assigned values with a Lewis-type acid catalyst in the presence of an anhydrous organic solvent, and recovering said 1-desmethyl colchicinic derivative.

These and other objects of the invention will become more apparent as the description thereof proceeds.

We have now discovered how to effect chemical transformations on the function which is found on the number 1 carbon atom of colchicinic compounds.

The invention therefore has for its object a process of selective demethylation of the methyl ether in the 1 position of the said compounds.

The new process of selective demethylation in the 1 position of these compounds is characterized by the employment of a catalyst of the Lewis-acid type. The directing effect of these catalysts proceeds, as much as it can be explained according to the present state of actual knowledge, from the molecular dimensions of the catalyst. It is these dimensions which are decisive for the selectivity of the demethylation reaction. Among the catalysts of the Lewis-acid type, tin chloride and titanium chloride are especially suitable. It is quite evident, however, that these theoretical considerations limit in no fashion the scope of the invention.

The process of demethylation of derivatives of the colchicine series, representing the object of the invention, is characterized essentially in that a derivative of this series of Formula II:

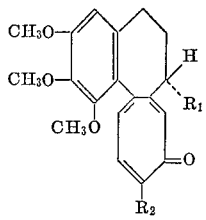

wherein $R_1$ represents a member selected from the group consisting of hydrogen and

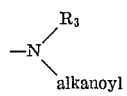

where $R_3$ represents a member selected from the group consisting of hydrogen and lower alkyl, and $R_2$ represents a member selected from the group consisting of lower alkoxy, thio-lower-alkyl, and

where $R_4$ and $R_5$ are selected from the group consisting of lower alkyl and, when taken together with the nitrogen, pyrrolidyl and piperidinyl, is subjected to the action of a catalyst of a Lewis-acid type in the presence or in the absence of a lower acylating agent and while operating in an anhydrous organic solvent. The resultant product is, if necessary, saponified with the aid of an alkaline agent, and the 1-desmethyl colchicinic derivative is isolated, corresponding to the general formula:

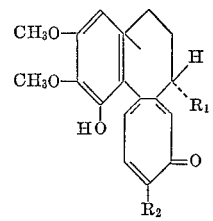

(I)

wherein $R_1$ and $R_2$ have the above-assigned values.

According to a preferred manner of performance for the process of the invention, the Lewis-acid catalyst is selected from tin chloride and titanium chloride The demethylation reaction is conducted in an anhydrous organic solvent, preferably a chlorinated hydrocarbon solvent, such as methylene chloride or chloroform. The reaction is conducted at temperatures from about 0° C. to the reflux temperature and preferably at about room temperature. If the reaction is conducted in the presence of a lower alkanoic acid acylating agent, this acylating agent is selected from the group consisting of lower alkanoic acid anhydrides and lower alkanoic acid halides, preferentially acetyl chloride.

According to the type of the starting colchicinic derivatives, two variations of the process can be utilized:

(1) In the case of derivatives of the colchicinic series having a mercaptan function in the 10 position (compound of general Formula II where $R_2$ represents thio-lower-alkyl), the reaction is preferably conducted in the absence of a lower acylating agent. The possible cleavage in the course of reaction of an acetyl group on the nitrogen on the 7 position (where $R_1$ is —NHCOCH$_3$) is easily rectifiable by subseqeunt acylation.

(2) In the case of derivatives of the colchicine series having an ether function in the 10 position (compound of general Formula II where $R_2$ represents lower alkoxy), the reaction is preferably conducted in the presence of a lower alcylating agent, as, for example, acetyl chloride. This reaction leads to the intermediate 1-acyloxy colchicinic derivative of the general Formula III.

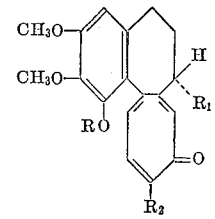

III wherein R represents lower alkanoyl and $R_1$ and $R_2$ have the above-assigned values. This intermediate is then saponified according to the usual methods, particularly by an aqueous alcoholic alkali metal hydroxide solution.

The process of the invention is summarized by the flow diagram of Table I.

TABLE I

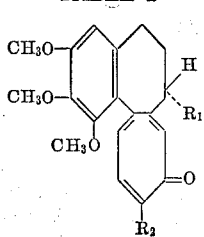

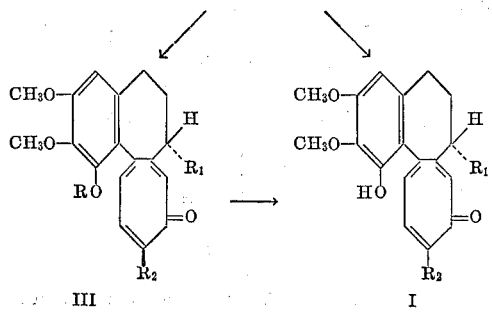

R, R₁ and R₂ have the above-assigned values.

The new compounds of Formula I obtained according to the process, representing the object of the invention, find their application in the field of biology and industry, similarly as colchicine. These compounds are especially useful in the modifications of mitosis and the creation of polyploids, either by distribution of aqueous solutions or suspensions of the products in cultivated soils, or by preliminary treatment of seeds with the products, either pure or diluted in a solvent or on a carrier.

The following examples illustrate the invention without, however, limiting the same in any manner. Other expedients known to those skilled in the art may be employed without departing from the invention. In particular, it should be understood that the process of the invention is applied in the same manner to other colchicine derivatives, as for instance the desacetylamidocolchicinic derivatives where $R_1$=H, etc.

Example I.—Preparation of 1-desmethyl colchicine
(I, $R_1$=—NHCOCH₃, $R_2$=OCH₃)

Step A: 1-desmethyl colchicine acetate (III, R=COCH₃, $R_1$=—NHCOCH₃, $R_2$=OCH₃).—1 gm. of colchicine (II, $R_1$=—NHCOCH₃, $R_2$=OCH₃) was dissolved in 10 cc. of methylene chloride and cooled in a bath of ice water. 3 cc. of acetyl chloride were added thereto, and then 1 cc. of stannic chloride was introduced dropwise into the mixture.

The reaction mixture was allowed to stand for 30 hours at room temperature, then it was poured into ice water. Acetic acid was added to dissolve the precipitate formed, and the acidified aqueous solution was extracted with methylene chloride.

The extracts were combined and washed first with a solution of sodium bicarbonate, then with water, dried and distilled to dryness under vacuum. The residue was crystallized from ethyl acetate, which yielded 0.3 gm. of 1-desmethyl colchicine acetate (III, R=COCH₃, $R_1$=—NHCOCR₃, $R_2$=OCH₃)

having a melting point of 243° C. and a specific rotation $[\alpha]_D^{20}$(15 minutes after dissolution)=—179°±3° (c.=0.5% in chloroform).

The product occurred in form of prisms, insoluble in water, dilute aqueous acids and ether, and soluble in alcohols, acetone, chloroform and hot benzene.

Analysis.—C₂₃H₂₅O₇N; molecular weight=427.44. Calculated: C, 64.62%; H, 5.9%; N 3.27%. Found: C, 64.6%; H, 5.9%; N, 3.2%.

This compound is not described in the literature.

Step B: 1-desmethyl colchicine (I, $R_1$=—NHCOCH₃, $R_2$=OCH₃).—2 gm. of 1-desmethyl colchicine acetate (III, R=COCH₃, $R_1$=—NHCOCH₃, $R_2$=OCH₃) were dissolved in 25 cc. of methanol. Over a period of 10 minutes, 5 cc. of normal sodium hydroxide solution were then added and the reaction mixture was agitated for 5 hours at room temperature.

The methanol was then distilled from the mixture under vacuum. Thereafter the aqueous mixture was poured into water and extracted with methylene chloride. The extracts were combined and washed with water, dried, filtered, evaporated to dryness under vacuum, and 0.4 gm. of an unidentified product was recovered.

The aqueous mother liquor and the alkaline wash waters were combined, filtered and acidified with 2 N hydrochloric acid solution. The precipitated product was vacuum filtered, washed with water and dried. About 0.83 gm. of 1-desmethyl colchicine (I, $R_1$=—NHCOCH₃, $R_2$=OCH₃) was recovered.

The product was purified by crystallization from a chloroform/ethanol mixture. Pure 1-desmethyl colchicine (I, $R_1$=—NHCOCH₃, $R_2$=OCH₃) was obtained having a melting point of 355° C. (with decomposition).

The product occured in form of pale yellow needles, insoluble in water and ether, very slightly soluble in alcohols, acetone, benzene and chloroform, soluble in dilute aqueous acids and very soluble in dilute aqueous alkalis.

Analysis.—C₂₁H₂₃O₆N; molecular weight=385.4. Calculated: C, 65.44%; H, 6.02%; N, 3.63%. Found: C, 65.3%; H, 6.0%; N, 3.5%.

This compound is not described in the literature.

Example II.—Preparation of 1-desmethyl thiocolchicine
(I, $R_1$=—NHCOCH₃, $R_2$=SCH₃)

20 gm. of thiocolchicine (II, $R_1$=—NHCOCH₃, $R_2$=SCH₃) were dissolved in 240 cc. of methylene chloride. 12 cc. of titanium tetrachloride were added thereto and the mixture was agitated for 2 hours at room temperature, then heated to reflux for 2 hours.

Next, the solution was poured on ice. The aqueous mixture was extracted with methylene chloride containing 30% of methanol. The extracts were combined and washed with water, dried, and concentrated under vacuum. The precipitate was vacuum filtered, washed with acetone and dried. 1-desmethyl thiocolchicine (I, $R_1$=—NHCOCH₃, $R_2$=SCH₃)

was obtained with a yield of 55% in regard to the theoretical. The product was recrystallized from 800 volumes of methylene chloride containing 50% of methanol to give a product having a melting point of 335–340° C.

The product occured in form of prismatic needles, insoluble in water and most of the usual organic solvents, and soluble in dilute aqueous alkalis.

Analysis.—C₂₁H₂₃O₅NS; molecular weight=401.47. Calculated: C, 62.82%; H, 5.78%; N, 3.49%; S, 7.98%; Found: C, 62.7%; H, 5.8%; N, 3.3%; S, 8.21%.

This compound is not described in the literature.

Example III—Preparation of 1-desmethyl thiocolchicine (I, $R_1$=—NHCOCH₃, $R_2$=SCH₃) by its acetate intermediate Step A: 1-desmethyl thiocolchicine acetate (III, R=COCH₃, $R_1$=—NHCOCH₃, $R_2$=SCH₃).—1 gm. of thiocolchicine (II, $R_1$=—NHCOCH₃, $R_2$=SCH₃) was dissolved in 10 cc. of anhydrous methylene chloride. 3 cc. of acetyl chloride were added and the mixture was cooled. Then 1 cc. of stannic chloride was introduced dropwise therein. The reaction mixture was allowed to stand at rest for 24 hours at room temperature.

The mixture was then poured into ice water and the aqueous mixture was extracted with methylene chloride. The extracts were combined and washed with dilute sodium hydroxide solution and then with a saturated aqueous salt solution, dried and distilled to dryness under vacuum. The product thus obtained was crystallized from ethyl acetate to obtain 0.47 gm. of 1-desmethyl thiocolchicine acetate (III, R=COCH$_3$, R$_1$=—NHCOCH$_3$, R$_2$=SCH$_3$), having a melting point of 210° C., then 220° C., and a specific rotation [α]$_D^{20}$=—183°±2° (C= 0.6% in chloroform).

The product occurred in form of prisms insoluble in water, dilute aqueous acids and ether, and soluble in alcohols, acetone, benzene and chloroform.

Analysis.—C$_{24}$H$_{25}$O$_6$NS; molecular weight=443.5. Calculated: C, 62.3%; H, 5.68%; N, 3.16%; S, 7.22%. Found: C, 62.5%; H, 5.7%; N, 3.0%; S, 7.5%.

This compound is not described in the literature.

Step B: 1-desmethyl thiocolchicine (I, R$_1$= —NHCOCH$_3$, R$_2$=SCH$_3$).—On saponification of the 1-desmethyl thiocolchicine acetate (III, R=COCH$_3$, R$_1$= —NHCOCH$_3$, R$_2$=SCH$_3$), according to the operative method described in Example I, Step B, the 1-desmethyl thiocolchicine (I, R$_1$=—NHCOCH$_3$, R$_2$=SCH$_3$) was obtained, identical with the product described in Example III.

The preceding specific embodiments are illustrative of the invention. It is to be understood, however, that such changes and modifications as would occur to one skilled in the art may be employed without departing from the spirit of the invention or the scope of the appended claims.

We claim:

1. A process for the production of a 1-desmethyl colchicinic derivative of the formula

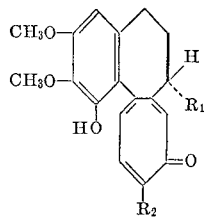

wherein R$_1$ represents

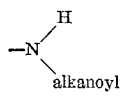

and R$_2$ represents a member selected from the group consisting of lower alkoxy and thio-lower alkyl, which comprises the steps of reacting a cholchicinic compound of the formula

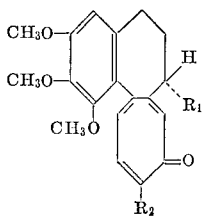

wherein R$_1$ and R$_2$ have the above-assigned values with a Lewis-type acid catalyst selected from the group consisting of stannic chloride and titanium chloride in the presence of an anhydrous organic solvent, and recovering said 1-desmethyl colchicinic derivative.

2. The process of claim 1 wherein said organic solvent is an anhydrous chlorinated hydrocarbon.

3. A process for the production of a 1-desmethyl colchicinic derivative of the formula

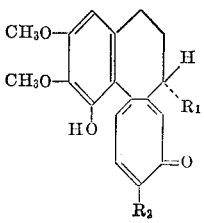

wherein R$_1$ represents

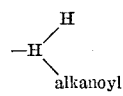

and R$_2$ represents a member selected from the group consisting of lower alkoxy and thio-lower-alkyl, which comprises the steps of reacting a colchicinic compound of the formula

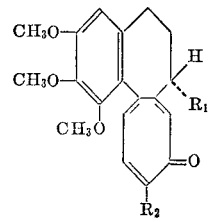

wherein R$_1$ and R$_2$ have the above-assigned values with a Lewis-type acid catalyst selected from the group consisting of stannic chloride and titanium chloride in the presence of an anhydrous organic solvent and an acylating agent selected from the group consisting of lower alkanoic acid anhydrides and lower alkanoic acid chlorides, saponifying the acylated 1-desmethyl colchicinic derivative of the formula

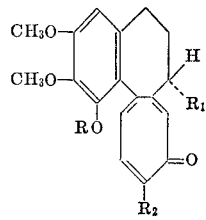

wherein R represents lower alkanoyl and R$_1$ and R$_2$ have the above-assigned values by the action of an alkaline solution, and recovering said 1-desmethyl colchicinic derivative.

4. The process of claim 3 wherein said organic solvent is an anhydrous chlorinated hydrocarbon.

5. The process of claim 3 wherein said acylating agent is acetyl chloride.

6. A process for the production of 1-desmethyl colchicine which comprises the steps of reacting colchicine with a Lewis-type acid catalyst selected from the group consisting of stannic chloride and titanium chloride in the presence of an anhydrous chlorinated hydrocarbon solvent and acetyl chloride, saponifying the 1-desmethyl colchicine acetate by the action of an aqueous alcoholic alkali metal hydroxide solution and recovering said 1-desmethyl colchicine.

7. A process for the production of 1-desmethyl thiocolchicine which comprises the steps of reacting thiocolchicine with a Lewis-type acid catalyst selected from the group consisting of stannic chloride and titanium chloride in the presence of an anhydrous chlorinated hydrocarbon solvent and acetyl chloride, saponifying the 1-desmethyl thiocolchicine acetate by the action of an aqueous alcoholic alkali metal hydroxide solution and recovering said 1-desmethyl thiocolchicine.

8. A process for the production of 1-desmethyl thiocolchicine which comprises the steps of reacting thiocolchicine with a Lewis-type acid catalyst selected from the group consisting of stannic chloride and titanium chloride in the presence of an anhydrous chlorinated hydrocarbon solvent and recovering said 1-desmethyl thiocolchicine.

(References on following page)

References Cited

UNITED STATES PATENTS 2,734,014    2/1956    Bellet et al. _____ 260—562 X
2,820,029    1/1958    Muller et al. _____ 260—562 X

OTHER REFERENCES

Thomas, C. A.: Anhydrous Aluminum Chloride in Organic Chemistry, Reinhold Publishing Co., New York, 1941, pp. 725–727.

Burwell, R. L.: Chem. Reviews, vol. 54, 1954, pp. 637–8 (1) and pp. 654–7 (2).

Morrison et al.: Organic chemistry, 2d edition, Allyn & Bacon, Inc., Boston, 1959, pp. 493–5.

LORRAINE A. WEINBERGER, *Primary Examiner.*

M. G. BERGER, *Assistant Examiner.*